United States Patent
Ido et al.

(10) Patent No.: US 9,778,611 B2
(45) Date of Patent: Oct. 3, 2017

(54) IMAGE FORMING APPARATUS AND REMAINING TONER AMOUNT ESTIMATION METHOD

(71) Applicant: CANON KABUSHIKI KAISHA, Tokyo (JP)

(72) Inventors: Yoko Ido, Yokohama (JP); Reiji Misawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/684,743

(22) Filed: Apr. 13, 2015

(65) Prior Publication Data

US 2015/0302284 A1 Oct. 22, 2015

(30) Foreign Application Priority Data

Apr. 21, 2014 (JP) .................................. 2014-087597
Jan. 20, 2015 (JP) .................................. 2015-008955

(51) Int. Cl.
*G03G 15/00* (2006.01)
*B41J 2/44* (2006.01)
*G06K 15/12* (2006.01)

(52) U.S. Cl.
CPC ............ *G03G 15/556* (2013.01); *B41J 2/442* (2013.01); *G06K 15/12* (2013.01)

(58) Field of Classification Search
CPC ...... G03G 15/556; G03G 15/553; G03G 15/55
See application file for complete search history.

(56) References Cited

U.S. PATENT DOCUMENTS

| | | | |
|---|---|---|---|
| 2006/0098995 A1* | 5/2006 | Kim .................. | G03G 15/0856 399/27 |
| 2011/0109927 A1* | 5/2011 | Mori ....................... | H04N 1/56 358/1.9 |
| 2012/0050783 A1* | 3/2012 | Osuki ................... | G06F 3/1204 358/1.14 |
| 2012/0224207 A1* | 9/2012 | Sueshige ............... | G06F 3/1205 358/1.13 |
| 2012/0268777 A1* | 10/2012 | Fry ....................... | G06F 3/1218 358/1.15 |

FOREIGN PATENT DOCUMENTS

JP 11-174909 A 7/1999

* cited by examiner

*Primary Examiner* — Christopher D Wait
(74) *Attorney, Agent, or Firm* — Rossi, Kimms & McDowell LLP

(57) ABSTRACT

A device having a function of adjusting image processing such as PWM setting, printer density setting and engine speed downstream of a video counter or a dot counter determines a correction coefficient of a video count value or a dot count value, according to a combination of adjustment values of image processing for realizing configured print settings, and corrects the count value by applying the correction coefficient to the video count value or the dot count value.

9 Claims, 14 Drawing Sheets

| | | | PRINT ENGINE CONTROLS | | | |
|---|---|---|---|---|---|---|
| JOB TYPE | PRINT SETTINGS | | PRINTER DENSITY | PWM | PRINT SPEED | COUNT CORRECTION VALUE |
| | DEFAULT | | 5 | 14/16 | HIGH | 95% |
| | TONER SAVING MODE | | 3 | 14/16 | HIGH | 85% |
| Mobile Print | SHEET TYPE: HEAVYWEIGHT | | 7 | 12/16 | NORMAL | 82% |
| | BARCODE MODE | | 5 | 13/16 | HIGH | 84% |
| | HALFTONE: GRAYSCALE | | ... | ... | ... | ... |
| | SILENT MODE | | ... | ... | ... | ... |
| | DENSITY ADJUSTMENT | | ... | ... | ... | ... |

F I G. 2A
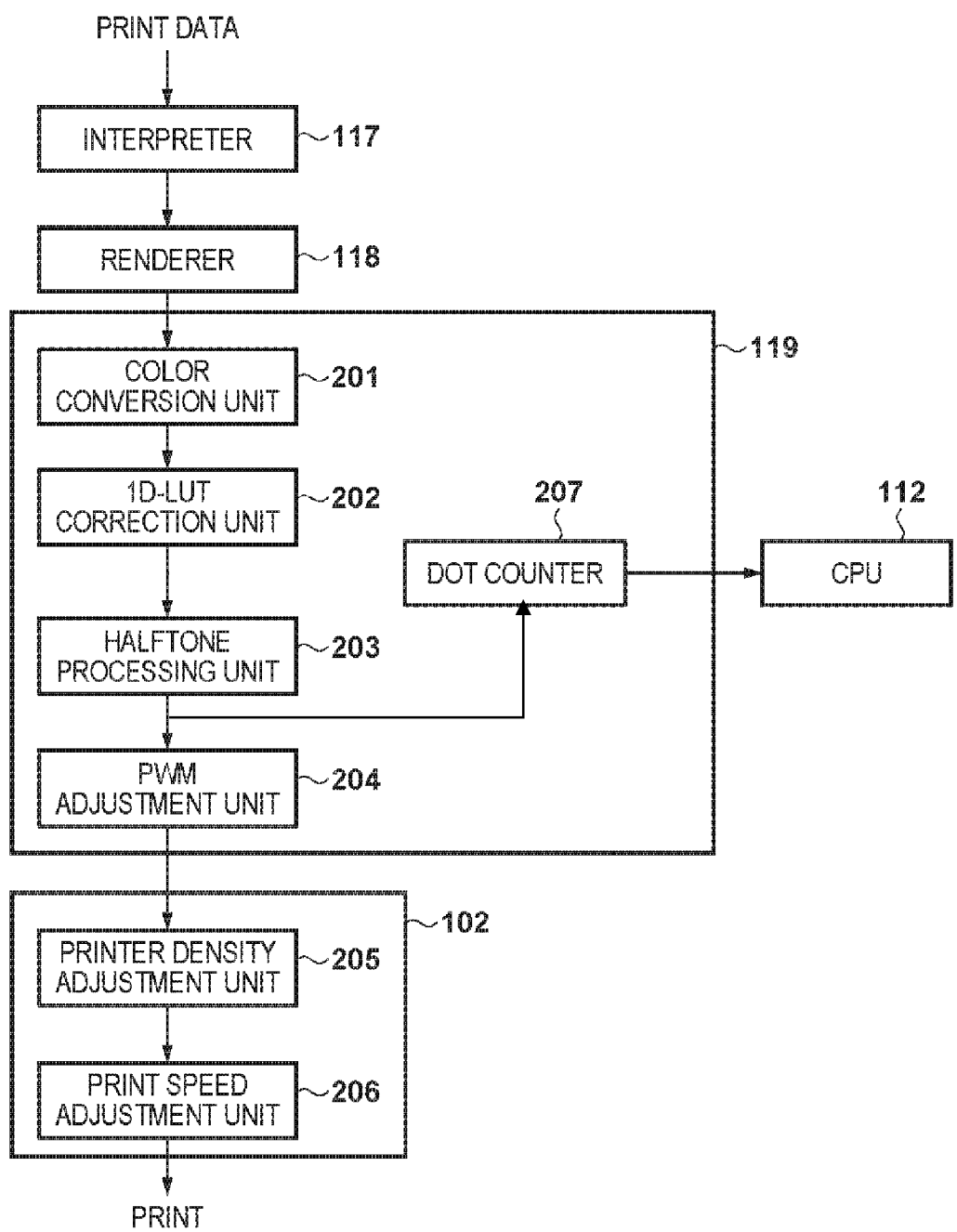

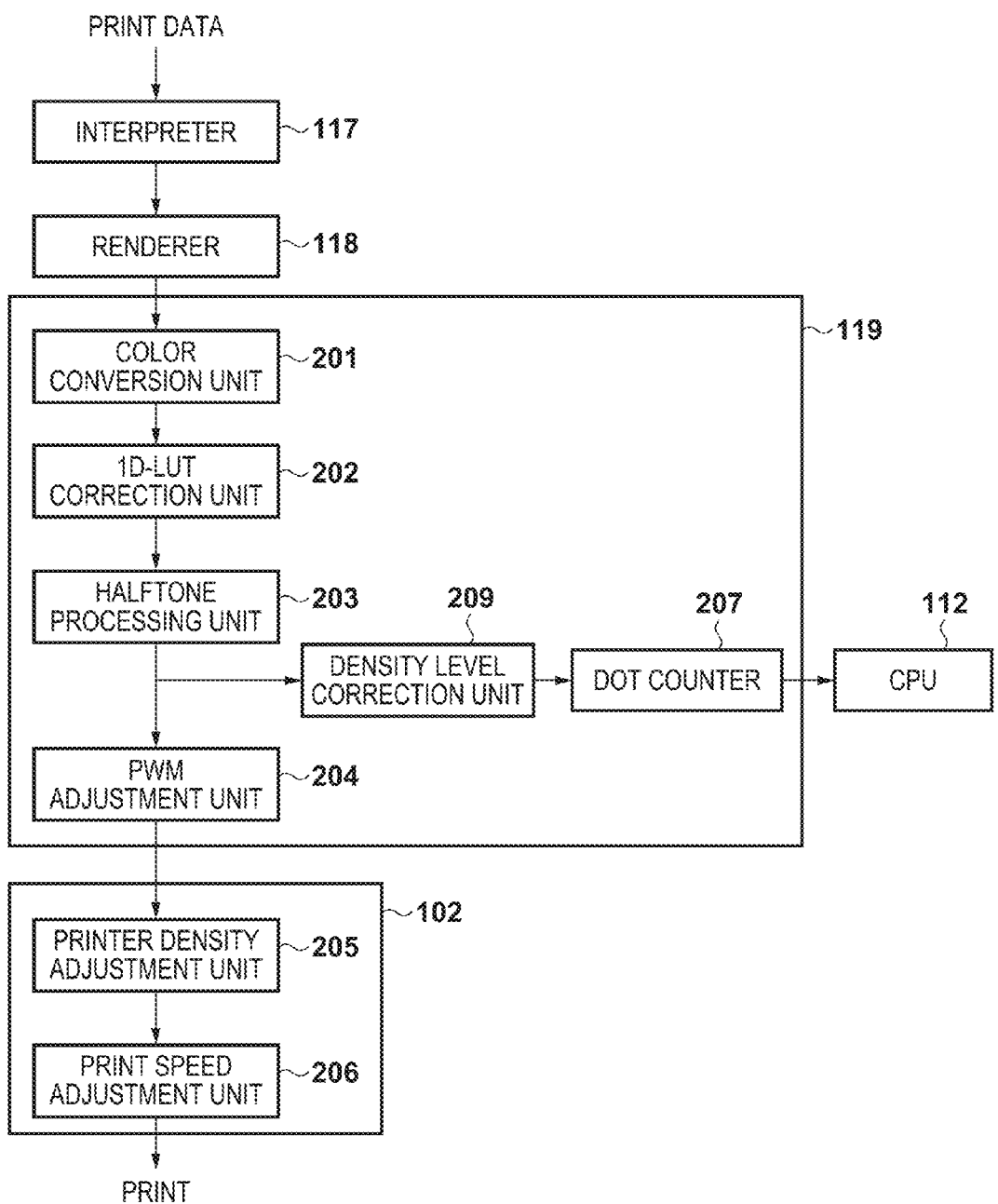

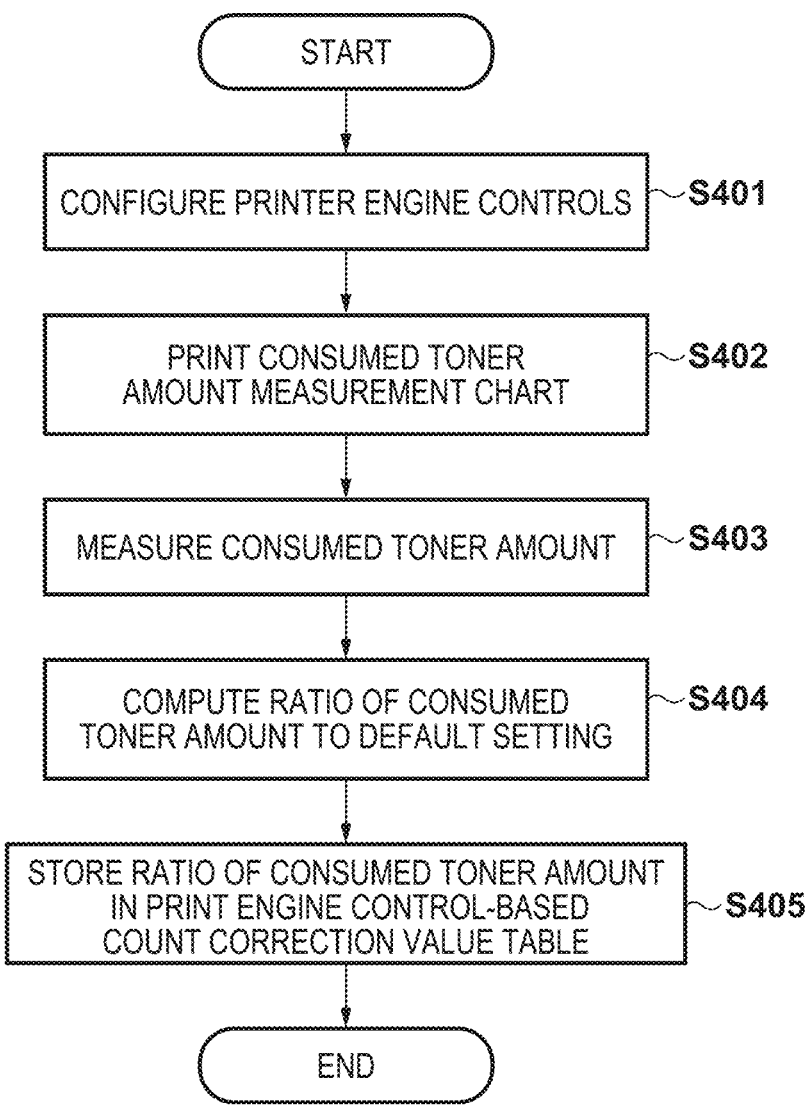

| JOB TYPE | PRINT SETTINGS | PRINT ENGINE CONTROLS | | | COUNT CORRECTION VALUE |
| --- | --- | --- | --- | --- | --- |
| | | PRINTER DENSITY | PWM | PRINT SPEED | |
| PDL Print | DEFAULT | 5 | 14/16 | NORMAL | 100% |
| | TONER SAVING MODE | 3 | 14/16 | NORMAL | 90% |
| | PAPER TYPE: HEAVYWEIGHT | 7 | 12/16 | LOW | 87% |
| | BARCODE MODE | 5 | 13/16 | NORMAL | 89% |
| | HALFTONE: GRAYSCALE | ... | ... | ... | ... |
| | SILENT MODE | ... | ... | ... | ... |
| | DENSITY ADJUSTMENT | ... | ... | ... | ... |
| COPY | ... | ... | ... | ... | ... |
| FAX | ... | ... | ... | ... | ... |

FIG. 8

| PRINT SPEED | LOW | | | | | | | | | NORMAL | | | | | | | | | HIGH | | | | | | | | | (UNIT: %) |
|---|---|---|---|---|---|---|---|---|---|---|---|---|---|---|---|---|---|---|---|---|---|---|---|---|---|---|---|---|
| PRINTER DENSITY → PWM ↓ | 1 | 2 | 3 | 4 | 5 | 6 | 7 | 8 | 9 | 1 | 2 | 3 | 4 | 5 | 6 | 7 | 8 | 9 | 1 | 2 | 3 | 4 | 5 | 6 | 7 | 8 | 9 | |
| 12/16 | 83 | 85 | 95 | 100 | … | … | … | … | … | … | … | … | … | 80 | … | … | … | … | … | … | … | … | 75 | … | … | … | … | |
| 13/16 | … | … | … | … | 94 | … | … | … | … | … | … | … | … | 89 | … | … | … | … | … | … | … | … | 84 | … | … | … | … | |
| 14/16 | … | … | … | … | 105 | 107 | 110 | 115 | 117 | 78 | 80 | 90 | 95 | 100 | 102 | 105 | 110 | 112 | 73 | 75 | 85 | 90 | 95 | 97 | 100 | 105 | 107 | |
| 15/16 | … | … | … | … | 108 | … | … | … | … | … | … | … | … | 103 | … | … | … | … | … | … | … | … | 98 | … | … | … | … | |
| 16/16 | … | … | … | … | 111 | … | … | … | … | … | … | … | … | 106 | … | … | … | … | … | … | … | … | 101 | … | … | … | … | |

PRINT SETTINGS

- 1001 — SHEET SIZE: A4 ▶
- 1002 — SHEET TYPE: PLAIN ▶
- 1003 — HALFTONE: GRAYSCALE ▶
- 1004 — MODE DETAILS: HIGH QUALITY ▶
- 1005 — TONER SAVING MODE: OFF ▶
- 1006 — BARCODE MODE: ON ▶
- 1007 — SILENT MODE: OFF ▶
- 1008 — DENSITY ADJUSTMENT: 0 ▶

[OK]  [CANCEL]

F I G. 12

| JOB TYPE | PRINT SETTINGS | DENSITY LEVEL CORRECTION TABLE ||
| --- | --- | --- | --- |
| | | INPUT DENSITY LEVEL(%) | OUTPUT DENSITY LEVEL(%) |
| PDL Print | DEFAULT | 0 | 0 |
| | | 100 | 100 |
| | TONER SAVING MODE | 0 | 0 |
| | | 100 | 90 |
| | SHEET TYPE: HEAVYWEIGHT | 0 | 0 |
| | | 100 | 87 |
| | BARCODE MODE | 0 | 0 |
| | | 100 | 89 |
| | HALFTONE: GRAYSCALE(2-BIT) | 0 | 0 |
| | | 33 | 33 |
| | | 66 | 66 |
| | | 100 | 100 |
| | HALFTONE: GRAYSCALE(4-BIT) | ... | ... |
| | SILENT MODE | ... | ... |
| | DENSITY ADJUSTMENT | ... | ... |
| COPY | | ... | ... |
| FAX | | ... | ... |

FIG. 13

| JOB TYPE | PRINT SETTINGS | PRINT ENGINE CONTROLS | | | COUNT CORRECTION VALUE |
| --- | --- | --- | --- | --- | --- |
| | | PRINTER DENSITY | PWM | PRINT SPEED | |
| Mobile Print | DEFAULT | 5 | 14/16 | HIGH | 95% |
| | TONER SAVING MODE | 3 | 14/16 | HIGH | 85% |
| | SHEET TYPE: HEAVYWEIGHT | 7 | 12/16 | NORMAL | 82% |
| | BARCODE MODE | 5 | 13/16 | HIGH | 84% |
| | HALFTONE: GRAYSCALE | ... | ... | ... | ... |
| | SILENT MODE | ... | ... | ... | ... |
| | DENSITY ADJUSTMENT | ... | ... | ... | ... |

IMAGE FORMING APPARATUS AND REMAINING TONER AMOUNT ESTIMATION METHOD

BACKGROUND OF THE INVENTION

Field of the Invention

The present invention relates to an image forming apparatus and a remaining toner amount estimation method, and, for example, relates to processing for estimating the amount of a coloring material that has been consumed.

Description of the Related Art

Electrophotographic image forming apparatuses such as multifunction peripherals, printers and the like sometimes have a remaining toner amount display function for displaying how much toner is left, in order to inform the user when it is time to replace a toner bottle or a toner cartridge. In order to realize remaining toner amount display, the amount of toner consumed up to the current point in time needs to be accurately measured or estimated, one means of which is a consumed toner amount estimation method proposed in Japanese Patent Laid-Open No. 11-174909.

Japanese Patent Laid-Open No. 11-174909 proposes a technique that involves a pulse accumulator accumulating the number of laser drive pulses as consumed toner amount indicator data, and estimating the consumed toner amount by applying correction values relating to image type, remaining toner amount and humidity to the accumulated number of laser drive pulses to accurately control toner supply. Here, the correction values are determined depending on image type which includes character/line mode, photograph mode and map mode.

Thus, in the conventional technology, the correction values that are applied to the consumed toner amount are determined from frequently-used density regions, the number of screen lines and the like in association with the image type. However, analog printer engine controls which are adjusted after the accumulated density is calculated by the pulse accumulator and affect the consumed toner amount are not subject to correction. This could possibly result in the estimation accuracy being unable to track the actual amount of toner consumed in the case where printer engine controls change.

SUMMARY OF THE INVENTION

The present invention has been made in view of the above conventional technology, and, even in the case where adjustment relating to print quality or the like is performed after estimation of the consumed toner amount based on image data, enables highly accurate consumed toner amount estimation that reflects the adjustment.

The present invention has the following configuration. According to an aspect of the present invention, there is provided a image forming apparatus comprising: a count unit that integrates density values of pixels of image data to obtain an integrated density value; an image forming unit that performs image forming on the image data by applying a print setting; a correction unit that corrects the integrated density value counted by the count unit, using a correction coefficient that depends on a job type and the print setting; and a unit that estimates a consumed toner amount based on the integrated density value corrected by the correction unit.

According to the present invention, even in the case where adjustment relating to print quality or the like is performed after estimation of the consumed toner amount based on image data by a video counter, a dot counter or the like, highly accurate consumed toner amount estimation that reflects the adjustment can be performed.

Further features of the present invention will become apparent from the following description of exemplary embodiments with reference to the attached drawings.

BRIEF DESCRIPTION OF THE DRAWINGS

FIG. 2A is a block diagram of an image processing unit and a printer unit.

FIG. 2C is a block diagram of an image processing unit and a printer unit.

FIG. 4 is a flowchart illustrating creation of a printer engine control-based count correction value table.

FIG. 8 is a diagram showing an example of a printer engine control-based count correction value table.

FIG. 10 is a diagram showing an exemplary print setting UI.

FIG. 12 is a diagram showing an example of a density level correction table.

FIG. 13 is a diagram showing an example of a print setting-based count correction value table for mobile prints.

DESCRIPTION OF THE EMBODIMENTS

Hereinafter, embodiments for carrying out the present invention will be described with reference to the drawings. Note that although the case where the present invention is applied to an electrophotographic printer will now be described as an embodiment of the invention, the invention is not limited thereto, and can be applied to any printer, facsimile machine, copier or similar image forming apparatus that performs image forming electrophotographically, without departing from the gist of the invention. Also, although the case where the present invention is applied to a black and white printer will be described here, the invention can also be applied to a color printer.

First Embodiment

Overall System Configuration

Figure 1:
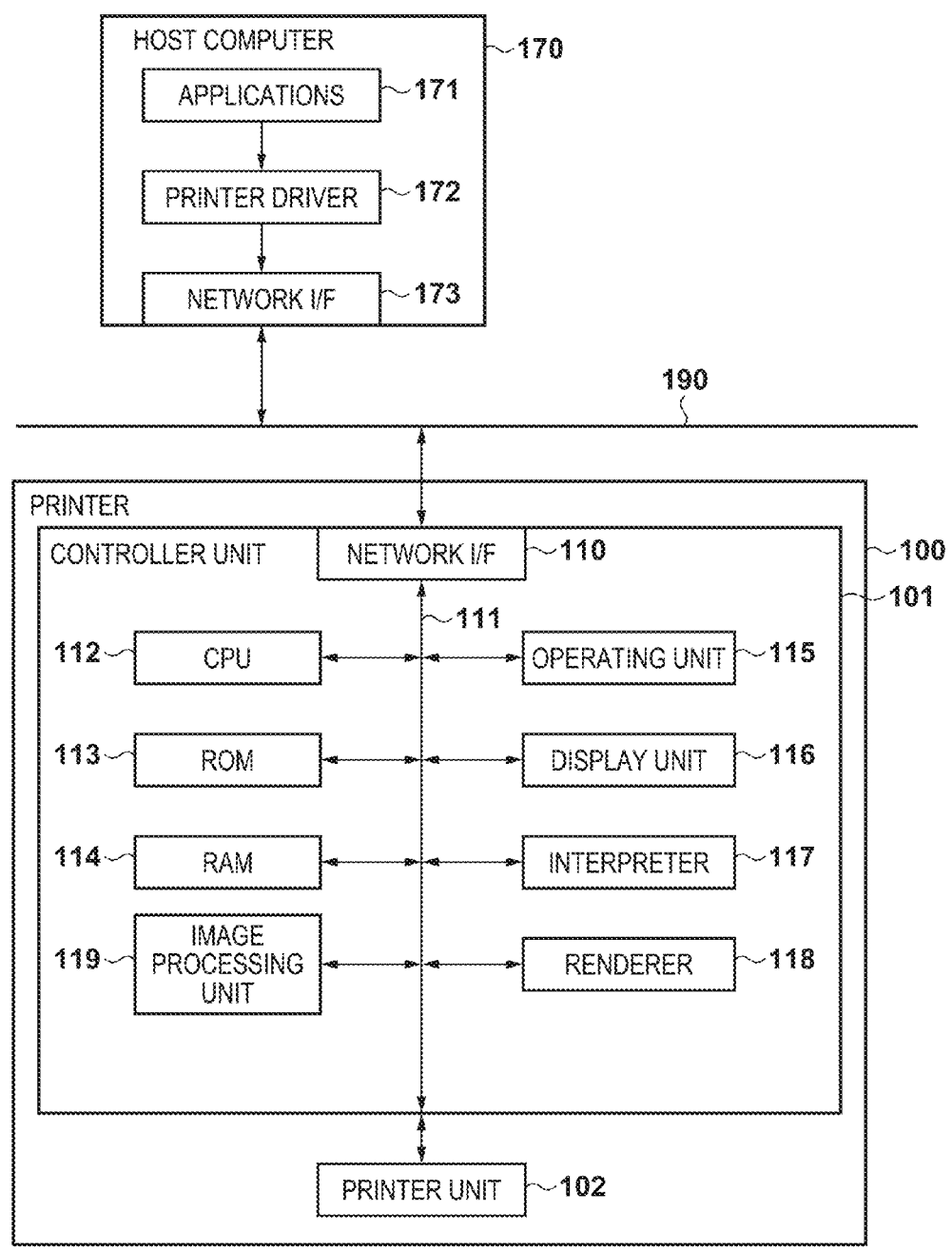
FIG. 1 is a system configuration diagram of an embodiment.

FIG. 1 is a system configuration diagram of the present embodiment, in which a host computer 170 and a printer 100 are connected via an external network 190. The host computer 170 sends a render command, and the printer 100, having received the render command, performs processing for converting the render command into image data that can be output and printing the image data onto a sheet.

Computer Configuration

The host computer 170 has applications 171 and a printer driver 172 installed therein, and a network I/F 173 mounted thereon. The applications 171 are applications that operate on the host computer 170, and page layout documents, word processor documents, graphic documents and the like can be created by using these applications. Digital document data created with such applications 171 is transmitted to the printer driver 172, and render commands based on the digital document data are generated. The render commands that are generated by the printer driver 172 are generally described in a printer description language for creating page image data that is called PDL (Page Description Language). Render commands usually include commands for rendering data such as text, graphics, images and the like. Generated render commands are transmitted via the network I/F 173 to the printer 100 through the external network 190. Print jobs thus transmitted from the host computer 170 to the printer 100 are called PDL prints. In addition, there are also jobs that the printer 100 can execute independently, with jobs for printing image data read by a scanner being referred to as copy jobs (copy), and jobs for performing facsimile transmission of image data read by a scanner or input from the host computer 170 being referred to as facsimile jobs (fax). Note that in the case where the host computer is not a general-purpose computer and does not have a printer driver that supports the printer 100, the jobs will not be described in a PDL and are thus referred to as mobile prints to distinguish them from PDL print jobs.

Printer Configuration

The printer 100 is constituted by a controller unit 101 and a printer unit 102. The controller unit 101 is, as shown in FIG. 1, constituted by various modules such as a CPU 112 and the like being connected via a data bus 111. A RAM 114 loads and temporarily stores program data that is stored in a ROM 113. The CPU 112 issues command to the various modules in accordance with the program data loaded in the RAM 114, and operates the printer 102. Also, data that is generated when the modules execute the commands and the like is also temporarily stored in the RAM 114. A network I/F 110 is an interface module that interfaces with the external network 190. The network I/F 110 performs bidirectional data communication that involves receiving render commands from other devices via the network 190 and transmitting device information (jam information, sheet size information, etc.) of the printer based on a communication protocol such as Ethernet.

A display unit 116 displays UI (user interface) screens showing instructions to the user and the status of the printer 102. Also, an operating unit 115 is an interface for receiving inputs from the user. The user is able to configure various print settings using the operating unit 115 and the display unit 116. Here, FIG. 10 shows an exemplary print setting UI relating to the present embodiment that is displayed on the display unit 116. The user is able to configure print settings, including a sheet size 1001 for selecting the size of a sheet (e.g., a paper sheet) such as A4 or Letter, a sheet type 1002 for selecting the type of a sheet such as plain or heavyweight, a halftone setting 1003 for selecting pseudo halftone processing such as grayscale dithering or error diffusion, a print mode setting (mode details) 1004 for configuring settings that relate to the number of grayscales and print speed such as high speed or high quality, a toner saving mode 1005 for saving toner to be used, a barcode mode 1006 for optimizing line thickness at the time of barcode printing, a silent mode 1007 for suppressing operating sound at the time of printing, and a density adjustment setting 1008 for changing the density of a print. Setting values of the print setting items given here are passed to a PWM adjustment unit 204, a printer density adjustment unit 205 and a print speed adjustment unit 206 which will be discussed later, and processing is respectively performed. Note that these print settings can also be set with the printer driver 172 of the host computer 170.

An interpreter 117 interprets a render command received via the network I/F 110, and generates intermediate language data. A renderer 118 generates a raster image from the generated intermediate language data. An image processing unit 119 performs image processing for outputting by the printer unit 102 on the generated raster image.

The printer unit 102 connected to the controller unit 101 is a printer that forms image data on a sheet using toner, based on the image data processed by the image processing unit 119.

Description of Print Processing and Dot Count Processing

FIG. 2A is a block diagram of the image processing unit 119 and the printer unit 102 illustrating print processing and dot count processing in the present embodiment. Here, processing will be described assuming the printer 100 is a monochrome printer. Note that, in the present embodiment, each block has a portion implemented as hardware, but the CPU 112 may execute processing based on programs stored in the ROM 113 having various processing functions. In this case, it is assumed that the program also supports the functions of writing and reading image data to and from the RAM 114.

FIG. 2A is a diagram illustrating print processing in a system that uses a dot counter. When an image rasterized by the interpreter 117 and the renderer 118 is input to the image processing unit 119 as a color RGB image, the input image is converted into a gray image by a color conversion unit 201. Next, the gray image undergoes luminance-density conversion and gamma correction processing using a one-dimensional look-up table (LUT) in a 1D-LUT correction unit 202, and pseudo halftone processing in a halftone processing unit 203. In this halftone processing unit 203, various parameters of the pseudo halftone processing (or quantization processing) are selected via the operating unit 115, such as selecting grayscale dithering or error diffusion as the method to be adopted as the pseudo halftone processing, and a 1-, 2- or 4-bit grayscale count, for example.

Figure 9:
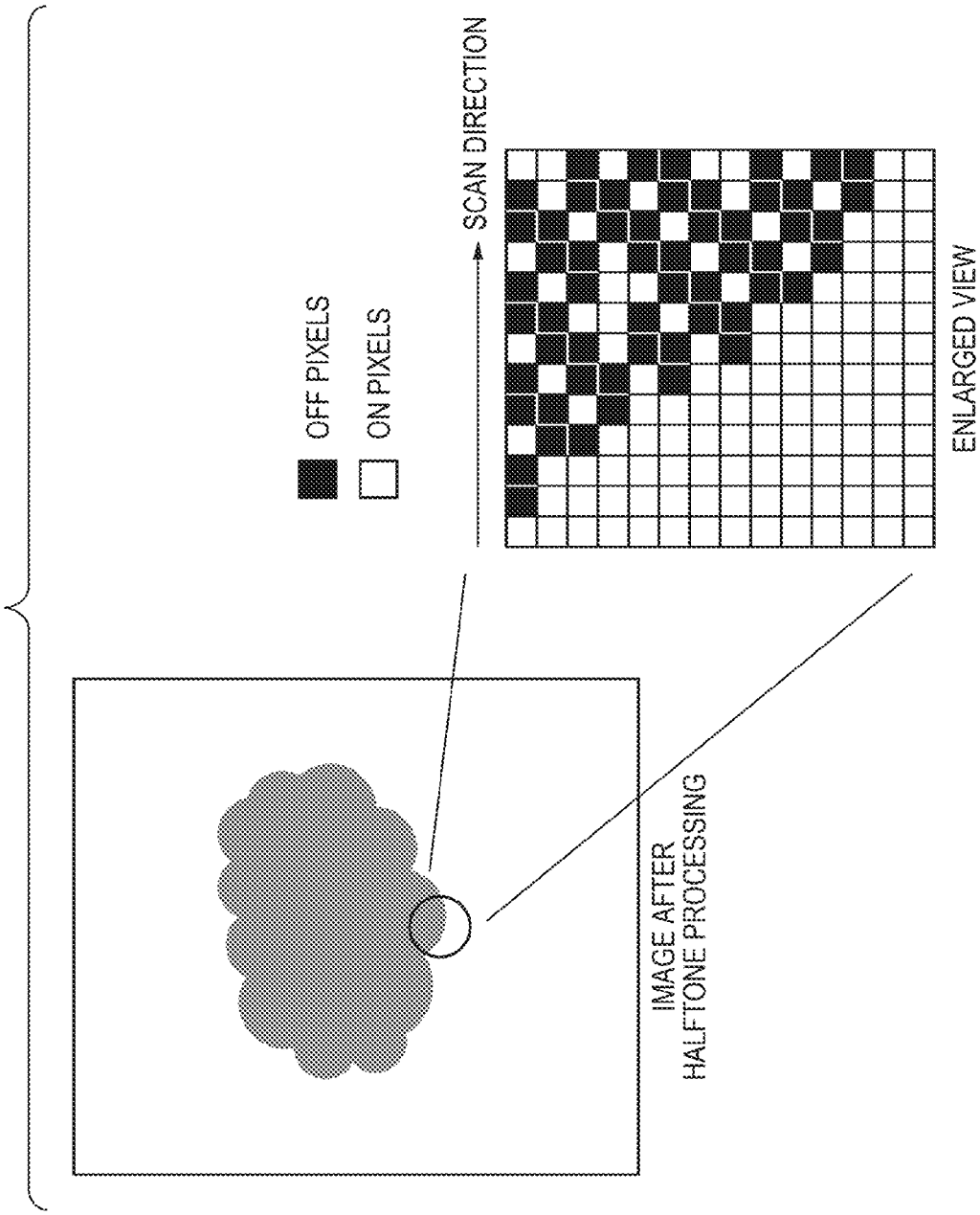
FIG. 9 is a diagram illustrating a dot count.

A dot counter 207 counts and sums the rendered pixels in the image data that has undergone halftone processing by the halftone processing unit 203. Here, the dot count of image data after undergoing halftone processing having a 1-bit grayscale count will be described with reference to FIG. 9. The grayscale level of rendered pixels (pixels having 100% density) is counted by scanning the halftone-processed image data one line at a time. Here, pixels having 0% density are counted as grayscale level 0 and pixels having 100% density are counted as grayscale level 15. By summing the grayscale levels of rendered pixels on the page, the amount of toner that was consumed when this image data was printed can thus be estimated by the CPU 112. Also, given that the grayscale level of pixels having 100% density is 15, the pixels of image data that has undergone halftone processing having a 2-bit grayscale count are counted as having one of the four grayscale levels 0, 5, 10 and 15. Similarly, the pixels of image data that has undergone halftone processing having a 4-bit grayscale count are counted as having one of 16 levels obtained by dividing the grayscale levels 0 to 15 at one level intervals. This enables substantially the same dot count value to be obtained, even when the same image data is printed using different grayscale counts.

Figures 5A, 5B:
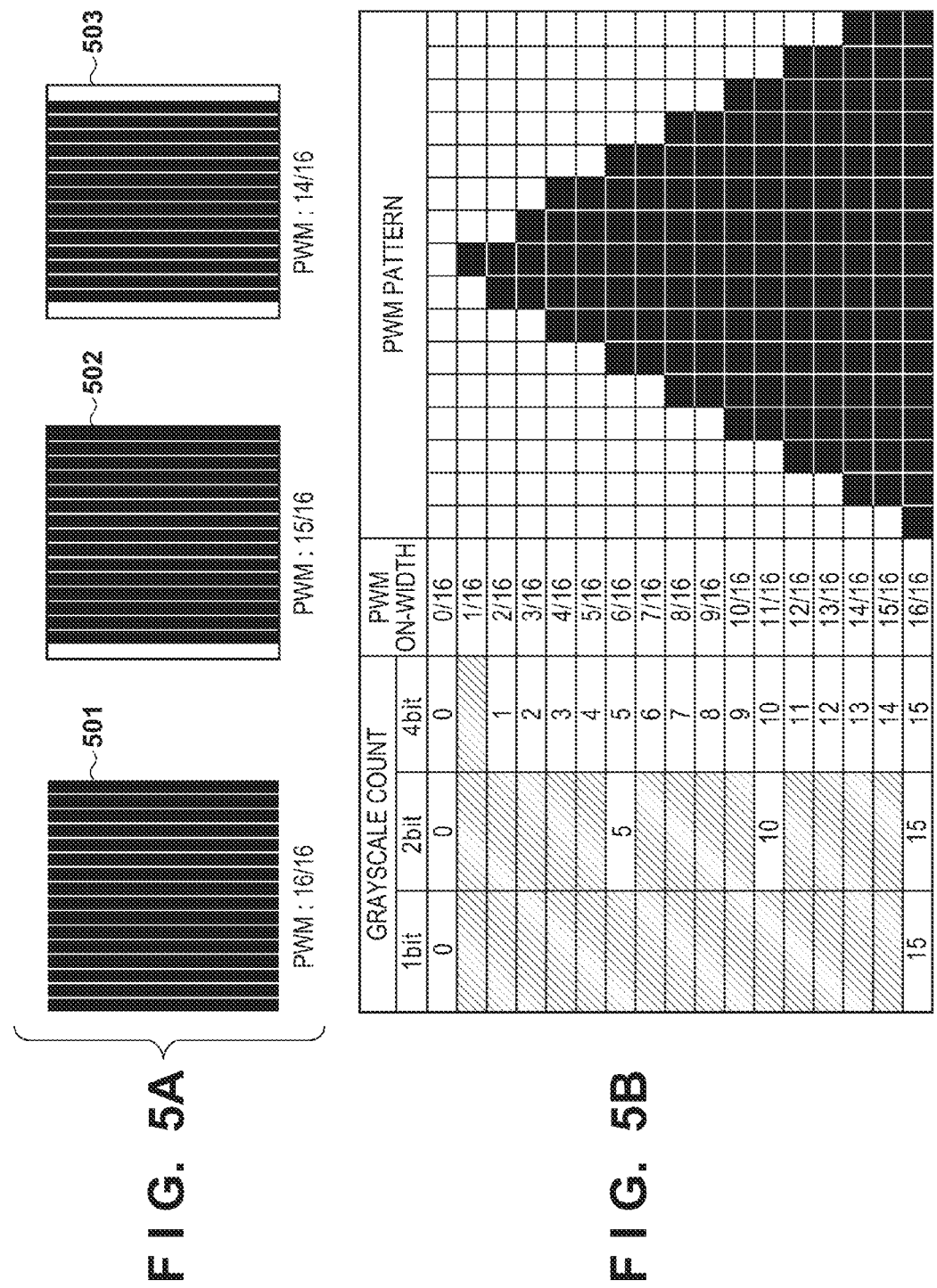
FIGS. 5A and 5B are diagrams illustrating PWM adjustment.

The PWM adjustment unit 204 performs pulse-width modulation (PWM) setting conversion for adjusting the pulse width of a laser that is output from a laser scanner of the printer unit 102, and realizes density adjustment, line width adjustment, and halftone grayscale counts. Here, the PWM adjustment unit 204 adjusts the laser emission intensity by converting the PWM setting width using a look-up table (LUT), according to a barcode mode setting configured with the operating unit 115, for example, and, as a result, adjusts the pixel width of pixels to be rendered. Here, FIG. 5A shows exemplary images after PWM setting width conversion. A dot 501 is an example of the case where the table values are set to turn on the entire laser pulse width (16/16) obtained by dividing 1 pixel into 16 parts. Also, dots 502 and 503 are respectively examples when laser pulse widths of 15/16 and 14/16 are turned on. This allows adjustment as to the line width and density with which rendered pixels are represented, that is, the extent to which toner is applied. As is clear from the diagram, the amount of toner that is applied, that is, the amount of toner that is consumed depends on the laser pulse width that is turned on.

Also, the PWM adjustment unit 204 applies a PWM pattern that depends on the respective grayscale level to image data output from the halftone processing unit 203 with the halftone grayscale count set via the operating unit 115. FIG. 5B shows an exemplary PWM pattern in which 1- and 2- and 4-bit grayscale counts are represented by the on-width of the laser pulse width obtained by dividing 1 pixel into 16 parts. For example, with a 2-bit grayscale count, four grayscale levels 0, 5, 10 and 15 are represented when 100% density is given as grayscale level 15, and the respective grayscale levels can be represented by turning on laser pulse widths of 0/16, 6/16, 11/16 and 16/16 as shown in FIG. 5B. Similarly, with 1- and 4-bit grayscale counts, grayscales can be represented by changing the on-width according to the respective grayscale levels. The PWM pattern corresponding to the respective grayscale levels given here is an example, and different on-widths and PWM patterns may be allocated.

Note that the PWM values described here represent a PWM pattern corresponding to respective grayscale levels in the case where PWM on-width is 16/16 with respect to pixels having 100% density. Here, in the case where the PWM on-width for pixels having 100% density is less than 16/16 at halftone grayscale counts of 2 and 4 bits, the PWM on-width is also reduced for pixels (gray pixels) having less than 100% density, so that the grayscale characteristics are substantially linear. For example, in the case where the PWM on-width of pixels having the grayscale level 15 (100% density) changes from 16/16 to 14/16 at a grayscale count of 2 bits, the PWM on-width of pixels having the grayscale level 10 changes from 11/16 to 10/16, for example, so as to be in a substantially linear relationship. This similarly applies to the case where the PWM on-width increases. Such a change in the pixel width of pixels that are rendered causes a change in density and a change in the amount of toner that is applied to the page. Therefore, in the present embodiment, the PWM setting value that is passed to the CPU 112 via the print settings that are configured on the operating unit 115 is used in correcting the consumed toner amount estimation value.

Figures 6, 7:
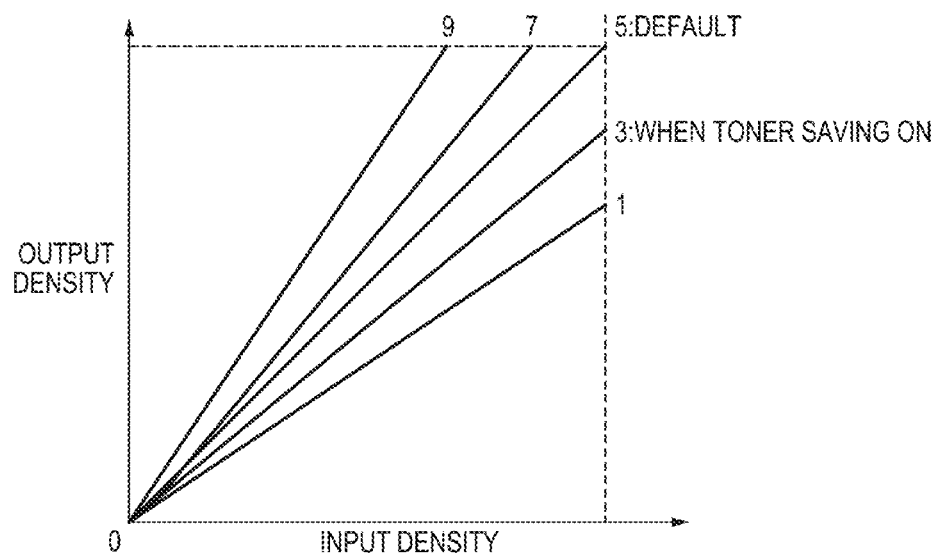
FIG. 6 is a diagram showing the change in density characteristics resulting from printer density adjustment.
FIG. 7 is a diagram showing an example of a print setting-based count correction value table.

Next, processing by the print unit 102 will be described. Note that, here, only processing by the print unit 102 that relates to the present embodiment will be described. A printer density adjustment unit 205 changes the electric charge for charging the photo sensitive drum, the electric charge of the toner and the like before a latent image is formed, for example, by changing process settings such as the voltage condition of the printer engine, and thus changes the amount of toner that is applied to increase or decrease the density of the printed matter that is output. That is, the input-output density characteristics are changed. Here, an example of a change in the density characteristics resulting from printer density adjustment is shown in FIG. 6. Nine steps of density characteristics 1 to 9, for example, are provided as the adjustment range that can actually be set, and the default setting is set to the middle step 5. As an example, when a toner saving setting is set to ON with the operating unit 115, the printer density adjustment unit 205 performs processing to reduce the process setting to 3. Since the amount of toner that is applied to the page changes as a result of such a change in density, in the present embodiment, the printer density setting value that is passed to the CPU 112 via the print settings that are configured with the operating unit 115 is used in correcting the consumed toner amount estimation value.

The print speed adjustment unit 206 performs processing for changing the print speed between low, normal and high, through the sheet size setting 1001, the sheet type 1002, the silent mode setting 1007, and the like. The print speed is realized by changing the speed of sheet conveyance or image forming, which may result in the amount of toner that is applied to the page increasing or decreasing, and thus, in the present embodiment, the print speed setting value that is passed to the CPU 112 via the print settings that are configured with the operating unit 115 is used in correcting the consumed toner amount estimation value. Image data that has undergone processing such as described above subsequently undergoes print processing.

Correction of Consumed Toner Amount Estimation

Figure 3:
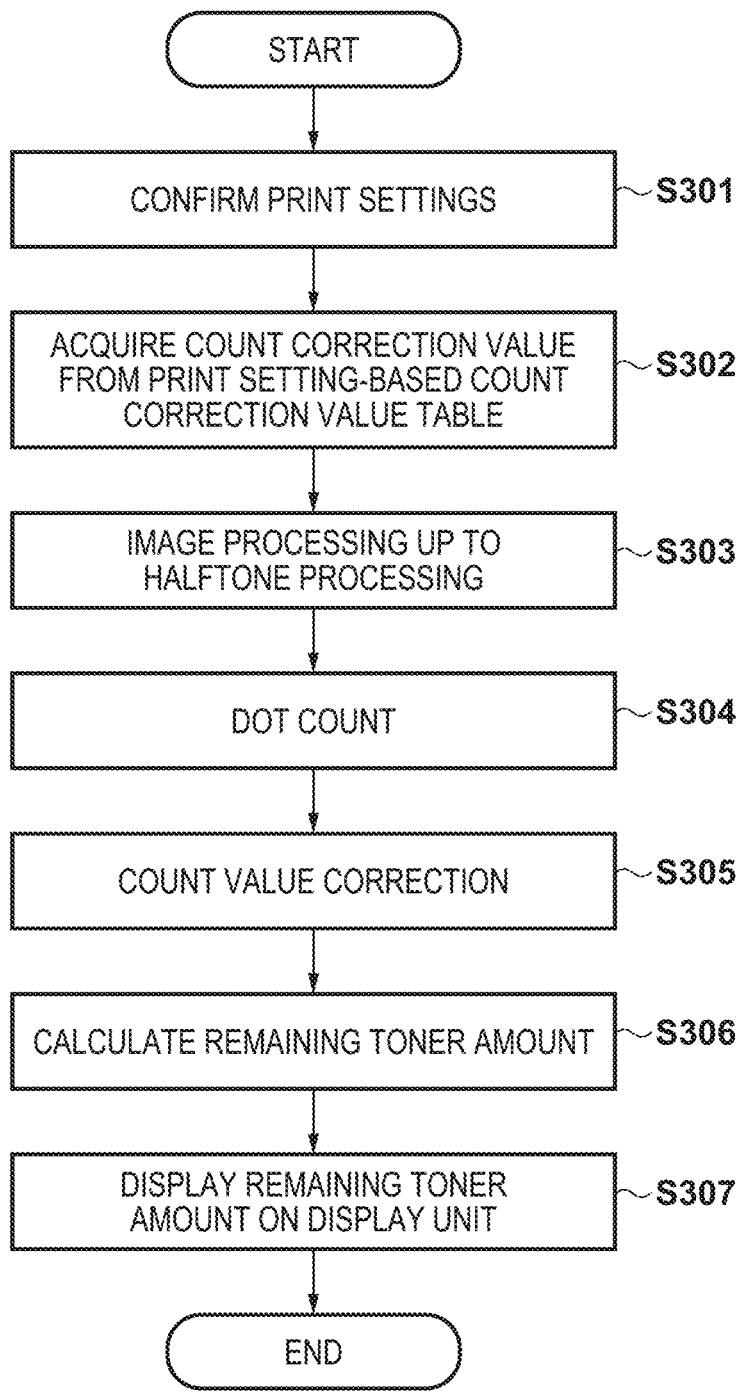
FIG. 3 is a flowchart illustrating operations at the time of printing.

FIG. 3 is a flowchart illustrating correction of consumed toner amount estimation (i.e., remaining toner amount estimation method) which is the main processing of the present embodiment. The procedure of FIG. 3 is executed by the CPU 112, having received an integrated value of the respective density values of the dots from the dot counter 207. Execution is triggered by the end of print processing executed with the same print settings, for example. This is because a change in the print settings leads a change in the count correction value. Accordingly, if the print settings are not changed, correction processing may be performed at any time.

In step S301, the CPU 112 refers to and confirms the print settings set by the user via the operating unit 115. The print settings referred to here are print settings such as shown in FIG. 10 relating to printer engine controls such as PWM adjustment, printer density adjustment and print speed adjustment that are adjusted downstream of the dot counter 207.

In step S302, the CPU 112 determines a count correction value 706 to be applied from a count correction value table (also referred to as a print setting-based count correction value table or a first count correction value table) 700 sorted by print setting shown in FIG. 7 that is stored in the ROM 113 or the RAM 114, in accordance with the print settings referred to. In this example, the count correction value is a coefficient, and can also be referred to as a correction coefficient.

Print Setting-Based Count Correction Value Table

Here, an example of the print setting-based count correction value table 700 is shown in FIG. 7. Here, printer engine control setting values such as printer density 703, PWM value 704 and print speed 705 and count correction values 706 are described for every job type 701 such as PDL print, copy and fax and every print setting 702. The PWM value 704 shows the ratio of laser pulse width to maximum density dots, the printer density 703 shows the voltage level discussed above, and the print speed 705 shows the speed that can be attained. The count correction value 706 is a value acquired from a printer engine control-based count correction value table 800 that is created separately, based on the combination of printer engine controls. For example, in the case where toner saving mode is set for a PDL print, assume that the printer is operated with printer density: 3, PWM: 14/16, and print speed: normal as the printer engine controls. The CPU 112 searches the printer engine control-based count correction value table 800 stored in the ROM 113 or the RAM 114 for a count correction value corresponding to these settings, and the retrieved value is set in the print setting-based count correction value table 700 as the count correction value 706. Because the printer engine control parameters are not required in the case of only correcting the count value, the print setting-based count correction value table 700 may be constituted by only the job type 701, the print settings 702, and the count correction value 706. Note that, the printer engine control parameters and the count correction values may be registered in advance in the print setting-based count correction value table 700 for all possible combinations of the print settings, or may be registered every time a combination of print settings is configured. In the case of the former, count correction values corresponding to the combinations of settings can be acquired directly from the print setting-based count correction value table 700. In the case of the latter, the product of the count correction values corresponding to those settings, for example, is set as the count correction value corresponding to combined settings. For example, according to FIG. 7, in the case of toner saving mode together with barcode mode, the count correction value is set to the product of count correction values of these print settings, that is, 0.9×0.89. This method of combining print settings is merely intended as an example, and other methods may be applied.

Note that rather than especially providing the print setting-based count correction value table 700, a configuration can also be adopted in which printer engine control parameters, such as printer density, PWM and print speed, for example, corresponding to the set job type and print settings are specified from a table that associates job type and print settings with printer engine controls (i.e., a table excluding count correction value 706 from table 700), and a count correction value is specified by searching the printer engine control-based count correction value table 800 with the specified parameters.

Printer Engine Control-Based Count Correction Table

FIG. 8 shows an example of the printer engine control-based count correction value table. Here, the table contains count correction values whose parameters are PWM value, printer density, and print speed. The count correction value is a value calculated as the toner consumption rate for each printer engine control setting given a default print setting of 100%. A method of creating this printer engine control-based count correction table will be discussed later. In the previous example, the printer engine control settings with which the printer is operated in toner saving mode are printer density: 3, PWM: 14/16, and print speed: normal, thus given a count correction value of 90%. The printer engine control-based count correction value table 800 is created by measuring the consumed toner amount for each setting, as illustrated with FIG. 4. The print setting-based count correction value table 700 is created by obtaining, from the printer engine control-based count correction value table 800, count correction values that depend on the printer engine control parameters set for each print setting.

Note that although FIG. 8 illustrates an example in which printer engine control-based count correction values are provided as a table and count correction is performed, count correction may be performed with a linear expression using slope and offset, instead of a count correction value table, in order to reduce the storage area.

Returning to FIG. 3, next in step S303, image processing up to halftone processing is performed on the input image data. In step S304, the grayscale levels of rendered pixels of the image data that has undergone halftone processing are counted in the dot counter 207. In step S305, the count correction value derived at step S302 is applied to the count value derived at step S304, and the consumed toner amount of the current print operation is derived. Here, the count value is multiplied by the count correction value. Next in step S306, the current consumed toner amount is subtracted from the remaining toner amount up to that point, and the present remaining toner amount is calculated. If the toner count has been reflected in the remaining toner amount, 0 is set as an initial value of the toner counter, in order to count the toner count value from 0 again. Note that the remaining amount immediately after toner replacement is assumed to be a predetermined value, and this value is set as the initial value of the remaining toner amount. When toner is replaced, the remaining toner amount is rewritten to this initial value. In step S307, the remaining toner amount calculated at step S306 is displayed on the display unit 116, and the processing is ended.

Creation of Printer Engine Control-Based Count Correction Value Table

Here, the creation method of the printer engine control-based count correction value table shown in FIG. 8 will be described with reference to FIG. 4.

In step S401, printer engine control parameters for measuring the consumed toner amount are configured. Printer engine control parameters described here are PWM adjustment, printer density adjustment and print speed adjustment, but other items may be included or some items may be excluded. In step S402, a consumed toner amount measurement chart is printed. In step S403, the consumed toner amount of the printed consumed toner amount measurement chart is measured. Note that, as an example of the measurement method, a chart transferred onto a sheet is removed in an unfixed state at the time of printing in step S402, and the weight of the toner on the sheet is measured. In step S404, the ratio of the consumed toner amount at the time of the current printer engine control settings to the consumed toner amount at the time of the default print settings is calculated as a toner count correction value for correcting the printer engine control parameters. Note that the consumed toner amount at the time of the default print settings is measured in advance. In step S405, the toner count correction value calculated at step S404 is written to the corresponding column of the printer engine control-based count correction value table 800. For example, in the case of FIG. 8, the consumed toner amount obtained with conditions where the printer density is 5, PWM is 14/16 and the print speed is normal as default configuration is given as 100%. The ratio of the consumed toner amount obtained with conditions where the printer density is 3, PWM is 14/16 and the print speed is low to the default consumed toner amount, that is, the toner count correction value, is 95 percent, and this value is written in the corresponding column.

The above operation is performed on each printer engine control setting to create the printer engine control-based count correction value table. The created printer engine control-based count correction value table is stored in the ROM 113 or the RAM 114. Note that although this operation need only be performed at the time of printer design, the operation may be performed again in the case where the state of the printer engine changes due to the influence of factors such as the use environment and aged deterioration.

Creation of Print Setting-Based Count Correction Value Table

Figure 11:
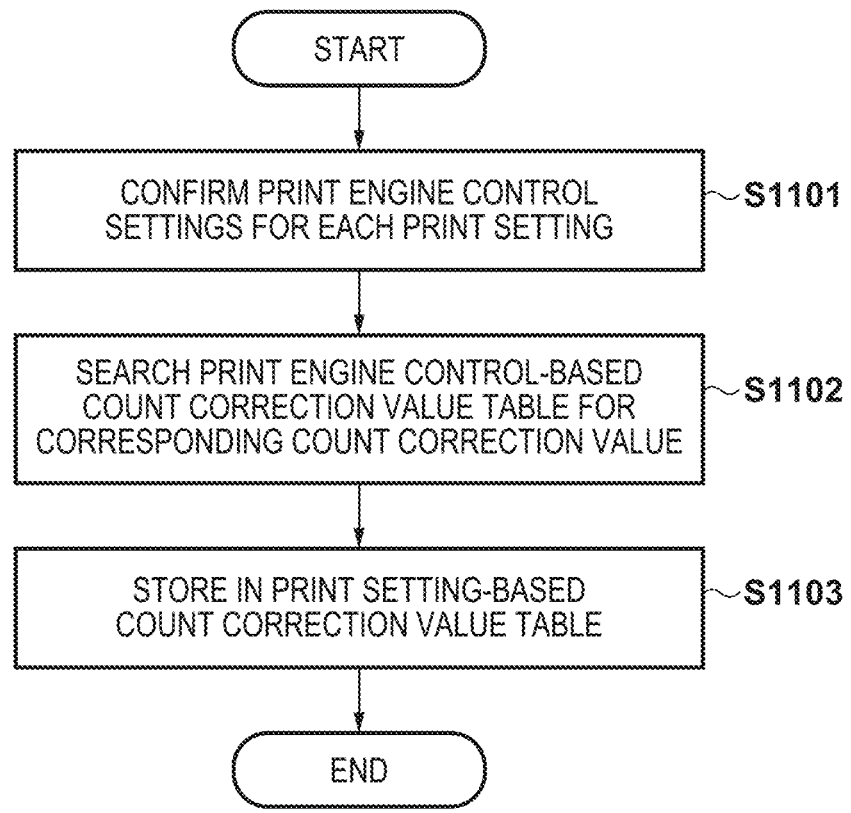
FIG. 11 is a flowchart illustrating creation of a print setting-based count correction value table.

Here, the method of creating a print setting-based count correction value table shown in FIG. 7 will be described with reference to FIG. 11. In step S1101, the setting values of printer engine control parameters such as PWM adjustment, printer density adjustment and print speed adjustment are checked for every print setting that is set with the operating unit 115 in this printer. The print settings checked here are items that affect the printer engine control settings that are configured downstream of the dot counter 207. In step S1102, the printer engine control-based count correction value table 800 is searched for a count correction value of the corresponding printer engine control setting. In step S1103, the retrieved count correction value is written to the count correction value 706 of the print setting-based count correction value table 700. The above operation is performed on each print setting to create the print setting-based count correction value table 700. The created print setting-based count correction value table 700 is stored in the ROM 113 or the RAM 114. Note that although this operation need only be performed at the time of printer design, the operation needs to be performed again when the state of the printer engine changes due to the influence of factors such as the use environment and aged deterioration, when the printer engine control parameters have changed relative to the print settings, and when the printer engine control setting-based count correction value table 800 is updated.

As mentioned above, by using the present embodiment, remaining toner amount display can be accurately performed by correcting the dot count value, even in the case where the printer engine controls that are performed downstream of the dot counter are adjusted.

Note that although the present embodiment was described with sheet type, sheet size, halftone setting, mode details, toner saving mode, barcode mode, silent mode and density adjustment as exemplary print settings, the present invention is not limited thereto in the case of print settings that affect the printer engine controls subsequent to the dot counter. Also, although the present embodiment was described giving PWM value, printer density and print speed as exemplary printer engine controls, the present invention is not limited thereto in the case of printer engine controls that are performed downstream of the dot counter.

Second Embodiment

Figure 2B:
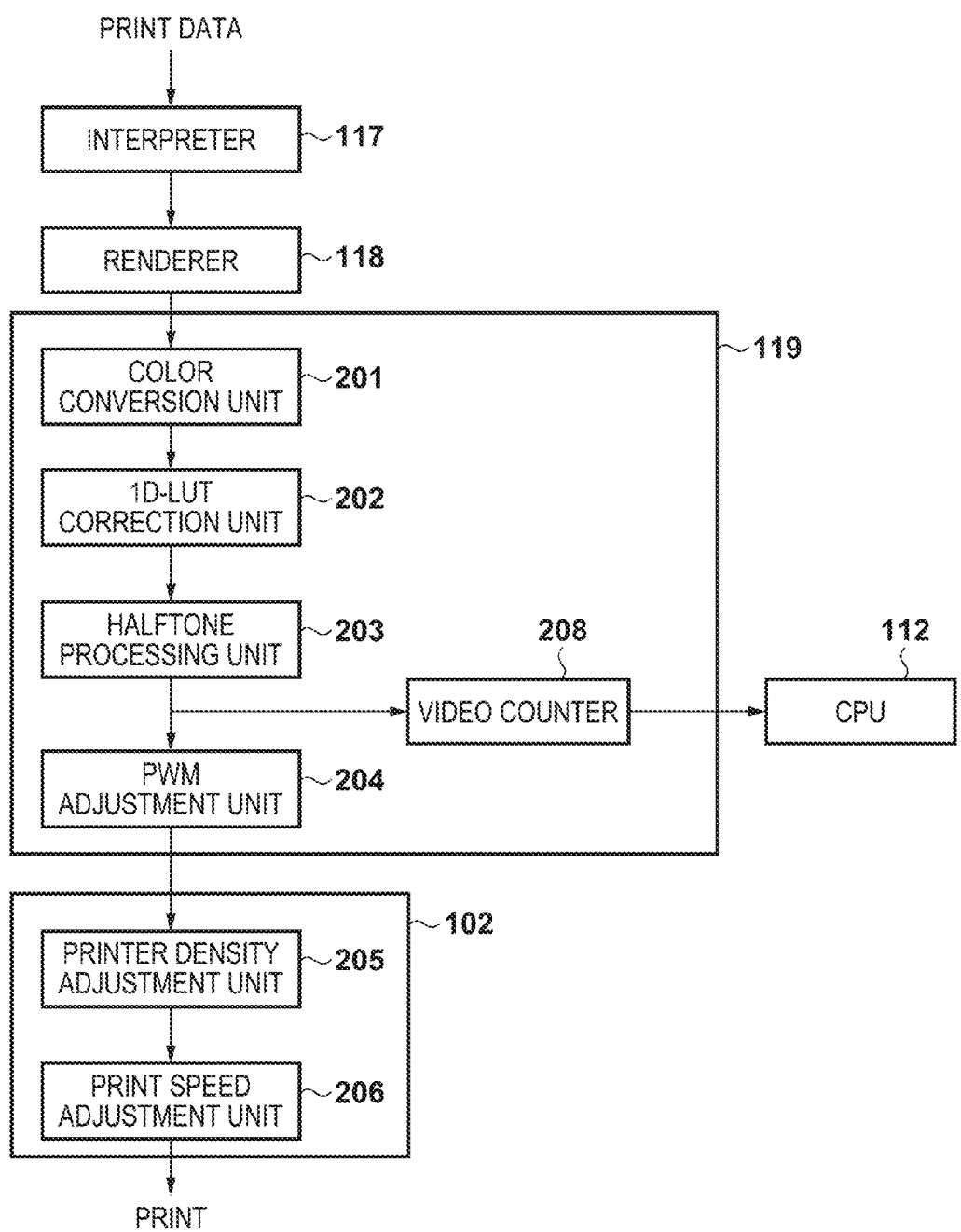
FIG. 2B is a block diagram of an image processing unit and a printer unit.

FIG. 2B is a block diagram of the image processing unit 119 and the printer unit 102 illustrating print processing and video count processing of the present embodiment. Here, processing will be described assuming the printer 100 as a monochrome printer.

FIG. 2B is a block diagram illustrating a system that has a video counter 208 instead of the dot counter 207 of the first embodiment. FIG. 2B differs from FIG. 2A is that the dot counter 207 counts downstream of the halftone processing unit 203, whereas the video counter 208 counts in a state where pixels take multiple values upstream of the halftone processing unit 203. However, apart from changing the dot count to a video count, the processing that is related to the present embodiment is similar to the first embodiment shown in FIG. 2A. Therefore, description is omitted here, since there is no difference in processing with regard to the other blocks.

Third Embodiment

Processing in the Case where Count Value Correction is not Performed

The present embodiment describes the case where count value correction is not performed. There are cases where the toner saving function and the density adjustment function are realized by printer density adjustment as mentioned above, and cases where the toner saving function and the density adjustment function are realized by reducing the grayscale characteristic with the 1D-LUT correction unit 202 of FIG. 2A, for example, at the time of the multivalued image signals upstream of the dot counter/video counter. There are also cases where switching is performed according to job type even with a single printer or multifunction peripheral, or where both implementation means are provided as separate functions. Therefore, even with functions having the same object such as toner saving and density adjustment, control is switched between not performing count value correction if these functions are implemented upstream of the dot counter/video counter and performing switching control such as count value correction is performed if these functions are implemented downstream of the dot counter/video counter. For this purpose, a determination similar to the determination that is implemented when switching the place where toner saving and density adjustment are performed is implemented before step S305 in the procedure of FIG. 3, for example, and if these functions are realized by printer density adjustment, step S305 is executed as in the first and second embodiments, and the estimated amount of consumed toner is corrected using the toner count correction value. On the other hand, if these functions are realized by image processing at the time of the multivalued image signals upstream of the dot counter/video counter, step S305 is skipped and correction on the consumed toner amount is not performed.

By adopting a configuration such as described above, the remaining toner amount can be estimated with even greater accuracy, by correcting or not correcting the estimated amount of consumed toner according to the print setting method.

Fourth Embodiment

Processing in the Case where a Plurality of Print Settings are Configured

The first embodiment described that the count correction value was also collectively applied to the combination of a print setting. Here, the case where a plurality of print settings with conflicting printer engine control settings are configured will be described. For example, in the case where the sheet type and the barcode mode are set at the same time, the printer engine control settings respectively differ, and the count correction values also differ. In this case, the count correction value is determined, based on the print setting that has a high priority functionally. If, in the aforementioned case, for example, the sheet type setting is determined to functionally have priority, a count correction value based on the sheet type setting is applied. The priority of such functions is decided in advance. In other words, in the case where the printer engine control parameters corresponding to print settings conflict, printer engine control parameters that are used in image forming are decided according to priority, and the count correction value is determined in accordance with the printer engine control parameters that are used in image forming.

Fifth Embodiment

Processing in the Case where Printer Engine Control Settings of the Default Print Settings are Changed Here, the case where printer engine control settings of the default print settings are changed will be described. There are cases where printer engine control settings change due to the influence of factors such as aged deterioration of the printer and environmental change. For example, the printer density of default configuration may be raised from 5 to 6, since the printer density has dropped. In such a case, with regard also to print settings other than default setting, the printer density is raised +1 and set, the printer engine control-based count correction value table 800 is searched again for a count correction value to be applied, and the retrieved count correction value is corrected and applied. The consumed toner amount can thereby be accurately estimated even when the status of the printer changes.

Sixth Embodiment

The first embodiment described performing count value correction by multiplying the count value that is output from the dot counter 207 by a correction coefficient that is shown in the printer engine control-based count correction value table. In the present embodiment, a method of correcting the density level before the count value is output from the dot counter 207 to thus correct the count value without performing correction using a printer engine control-based count correction value table will be described.

FIG. 2C is a block diagram of the image processing unit 119 and the printer unit 102 illustrating print processing in the present embodiment. Here, processing will be described assuming the printer 100 is a monochrome printer. FIG. 2C differs from FIG. 2A in that a density level correction unit 209 is provided upstream of the dot counter 207. In the density level correction unit 209, the density level is corrected using a density level correction table (1D-LUT). Here, correction of the density level by the density level correction unit 209 only affects the dot counter 207, and does not affect the density of the printed matter that is output.

Next, an example of the density level correction table is shown in FIG. 12. Here, a density level correction table is provided for every job type 701 such as PDL print, copy, and fax, and every print setting 702. The density level correction table is composed of an input density level (%) 1201 and an output density level (%) 1202. This means that, in the case of the "toner saving mode" print setting for a PDL print, for example, when the input density level is 100%, the output density level is corrected to 90%. Note that in order to simplify description, the output density level 1202 of FIG. 12 matched with the same values as the count correction value 706 of FIG. 7. Also, in the case of the "halftone: grayscale (2 bit)" print setting for a PDL print, correction with a higher degree of flexibility than correction of the count value as described above in the first embodiment is possible, since the output density level can be corrected, with respect to each 2-bit or four step input density level (0%, 33%, 66%, 100%). This is also applied to the case where the input density level is greater than 2 bits.

The dot counter 207 counts and sums the rendered pixels in the image data that has undergone density level correction by the density level correction unit 209. Here, the sixth embodiment differs from the first embodiment in that the sum of the grayscale levels for each pixel is counted, with the grayscale level of pixels having 0% density being 0, the grayscale level of pixels having 90% density being 90, and the grayscale level of pixels having 100% density being 100. A count value is thus output, by taking the sum of the grayscale levels of the rendered pixels on the page, and dividing the sum, by 100. Thus, the output density level can also be called a value obtained by multiplying the input density level by a predetermined correction coefficient, or a correction coefficient of the dot count value that is provided for each input density. Also, although, the first embodiment, the count value is corrected relative to the count value output by the dot counter 207, in the present embodiment, count value correction is not necessary.

Note that description of the method of creating a density level correction table (1D-LUT) will be omitted, since a similar method is used to the method of creating the printer engine control-based count correction value table shown in FIG. 8.

As described above, the printer engine control-based count correction value table is no longer required, in the case of a system configuration in which the density level correction unit 209 is provided upstream of the dot counter 207.

Note that a configuration may also be adopted in which correction of the density level by a density level correction unit and correction of the count value using a printer engine control-based count correction value table are performed selectively. For example, in an image forming apparatus having a scanner, reading a test pattern that is output from the image forming apparatus of the present embodiment with this scanner enables the status of the printer engine at the point in time at which the test pattern was output to be fed back. Thus, a configuration is also possible in which the correction that enables dynamic feed back of the status of the printer engine is performed by correcting the density level with a density level correction unit, and static correction such as described above is performed with a printer engine control-based count correction value table.

Seventh Embodiment

Although the first embodiment described a system in which the printer 100 is connected to the host computer 170 via the external network 190, the present invention is not limited thereto, and a system in which a mobile terminal is connected to the printer 100 via a wireless LAN router is possible. Note that jobs to be printed from a mobile terminal are called mobile prints. It is assumed that mobile terminals are often not provided with a printer driver corresponding to a PDL that can be processed by the printer 100, and mobile print jobs are not written in a PDL. A mobile print differs from a PDL print is this respect. In this system, the user configures print settings and gives print instructions from an application on the mobile terminal side, when performing file printing of JPEG, PDF and word document files. Here, toner saving, sheet type and the like are selectable as print settings. Note that, with a PDL print, as mentioned above in the first embodiment, the interpreter 117 of the printer 100 interprets a received render command and the renderer 118 generates a raster image, whereas with mobile print, JPEG, PDF or original compression data is received, and a raster image is generated by a decoder that is not shown.

Next, an example of a print setting-based count correction value table for mobile prints is shown in FIG. 13. In FIG. 13, in order to simplify description, the print settings for mobile prints are in common with the print settings 702 for PDL prints of FIG. 7. A printer speed 1301 is, however, set a faster speed than for PDL prints, assuming that with mobile prints importance is placed on printing speed. Also, a count correction value 1302 is set to a correction value suitable for the printer speed 1301.

As described above, correction of dot count values is possible not only with PDL print, copy and fax, but also with mobile print. Note that the print setting-based count correction value table given in FIG. 13 is not limited to discrimination of the job type "mobile print", and discrimination with PDL print may be performed with a format such as JPEG, PDF or the like received by the printer 100.

Note that the print setting-based count correction value table for mobile prints shown in FIG. 13 may be added to the print setting-based count correction value table 700 shown in FIG. 7 as a table corresponding to a different job type, or only the print setting-based count correction value table of FIG. 13 may be held if the system is mobile print specific.

Furthermore, a configuration can also be adopted in which the present embodiment is also applied to the configuration of FIG. 2C described in the sixth embodiment, and the density level correction unit 209 has a density level correction table corresponding to the job type "mobile print" instead of or in addition to the density level correction table of FIG. 12, and corrects the density level.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed calculating systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-087597, filed Apr. 21, 2014 and 2015-008955, filed Jan. 20, 2015 which are hereby incorporated by reference herein in their entirety.

What is claimed is:

1. An image forming apparatus comprising:
a memory device that stores a set of instructions; and
at least one processor that executes the instructions to:
receive print data;
generate a raster image based on the received print data;
count pixels in the generated raster image;
execute at least two predetermined image forming processes based on the generated raster image, wherein the at least two predetermined image forming processes include a first image forming process and a second image forming process different than the first image forming process, and wherein the second image forming process is executed after the first image forming process;
determine a correction coefficient with reference to a correction table based on a combination of at least two printer engine control parameters, wherein the at least two printer engine control parameters include a first printer engine control parameter for the first image forming process and a second printer engine control parameter for the second image forming process;
correct a value of the counted pixels based on the determined correction coefficient; and
estimate a consumed toner amount based on the corrected value.

2. The image forming apparatus according to claim 1, wherein the memory device stores, in advance, the combination of the at least two printer engine control parameters that include the first printer engine control parameter and the second printer engine control parameter, and the correction table for associating correction coefficients derived based on toner consumption measured by performing a test where an image is printed on a sheet using the combination of the at least two printer engine control parameters, and
wherein the value of the counted pixels is corrected based at least on the correction coefficients obtained from the correction table using, as a search key, the combination of the at least two printer engine control parameters used for printing the raster image in the test.

3. The image forming apparatus according to claim 1, wherein the first image forming process is an image forming process in which a laser scanner outputs a laser to a photosensitive drum, based at least on the generated raster image, to expose the photosensitive drum by the laser, and the first printer engine control parameter is a parameter for adjusting a laser emission intensity, and
wherein the second image forming process is an image forming process for applying toner to the photosensitive drum, and the second printer engine control parameter is a parameter for adjusting a density of the applied toner in the image forming process.

4. An image forming apparatus comprising:
a printer configured to print an image on a sheet; and
a processor connected to a storage device that stores instructions, the processor configured to execute the instructions to:

generate a raster image based on input data;

count the number of dots of the generated raster image;

control the printer to print the image, based on the generated raster image, on the sheet;

determine a correction coefficient with reference to a correction table based on a combination of at least two printer engine control parameters for printing the generated raster image, wherein the at least two printer engine control parameters include a first printer engine control parameter for adjusting an emission intensity of a laser scanner by the printer, and a second printer engine control parameter for adjusting a print density in an image forming process in which the printer applies toner to a photosensitive drum; and determine a consumed toner amount used for printing according to the determined correction coefficient and the number of dots of the generated raster image.

5. The image forming apparatus according to claim 4, further comprising:

a memory device configured to store a combination of the at least two printer engine parameters and the correction table for associating correction coefficients derived based on toner consumption measured by performing a test where an image is printed on a sheet using the combination of the at least two printer engine control parameters, wherein the amount of toner consumption is determined based on the number of dots of the generated raster image and the correction coefficient obtained from the correction table using, as a search key, the combination of the at least two printer engine control parameters used for printing the raster image.

6. The image forming apparatus according to claim 4, wherein the printer prints the image on the sheet by executing at least two image forming processes, wherein the at least two image forming processes include a first image forming process in which a laser scanner outputs a laser to a photosensitive drum based on the generated raster image, and a second image forming process in which toner is applied to the photosensitive drum, and wherein the first printer engine control parameter is a parameter for adjusting an emission intensity of the laser scanner in the first image forming process and the second printer engine control parameter is a parameter for adjusting an applied toner density in the second image forming process.

7. The image forming apparatus according to claim 6, wherein the second printer engine control parameter adjusts, at least, a voltage condition regarding electrostatic charge in the image forming processes, and wherein the toner density applied to the photosensitive drum is adjusted by adjusting the voltage condition.

8. The image forming apparatus according to claim 4, wherein the dot count is counted based on a dot to which toner is applied in image formation and a grayscale level of the dot.

9. The image forming apparatus according to claim 4, further comprising a display device, wherein the processor is further configured to execute instructions to control the display device to display a remaining toner amount determined based on the consumed toner amount used for printing and a remaining toner amount before printing.

\* \* \* \* \*